June 16, 1936. E. F. HAUSERMAN ET AL. Re. 20,008

WALL STRUCTURE

Original Filed Sept. 7, 1926 2 Sheets-Sheet 1

INVENTORS
Earl F. Hauserman,
Leroy D. Mowery and
John A. Bohneack.
BY
Fay, Oberlin & Fay
ATTORNEYS June 16, 1936. E. F. HAUSERMAN ET AL Re. 20,008

WALL STRUCTURE

Original Filed Sept. 7, 1926 2 Sheets-Sheet 2

INVENTORS
Earl F. Hauserman,
Leroy D. Mowery and
John A. Bohnsack.
BY
Fay, Oberlin & Fay
ATTORNEYS Reissued June 16, 1936 Re. 20,008

UNITED STATES PATENT OFFICE 20,008

WALL STRUCTURE

Earl F. Hauserman, Cleveland Heights, Leroy D. Mowery, Cleveland, and John A. Bohnsack, Cleveland Heights, Ohio, assignors to The E. F. Hauserman Company, Cleveland, Ohio, a corporation of Ohio Original No. 1,681,805, dated August 21, 1928, Serial No. 134,110, September 7, 1926. Application for reissue February 18, 1935, Serial No. 7,153

18 Claims. (Cl. 189—34)

This invention relating, as indicated, to wall structures has more particular reference to construction adaptable to interior use, and it is among the objects of the invention to provide a construction which is substantial and yet not of great weight, and which may be readily assembled or disassembled at will. Other objects will appear as the description proceeds.

To the accomplishment of the foregoing and related ends, the invention, then, consists of the means hereinafter fully described, and particularly pointed out in the claims, the annexed drawings and the following description setting forth in detail certain features embodying the invention, such disclosed means constituting however, but few of the various forms in which the principle of the invention may be used.

In said annexed drawings:—

Figure 1:
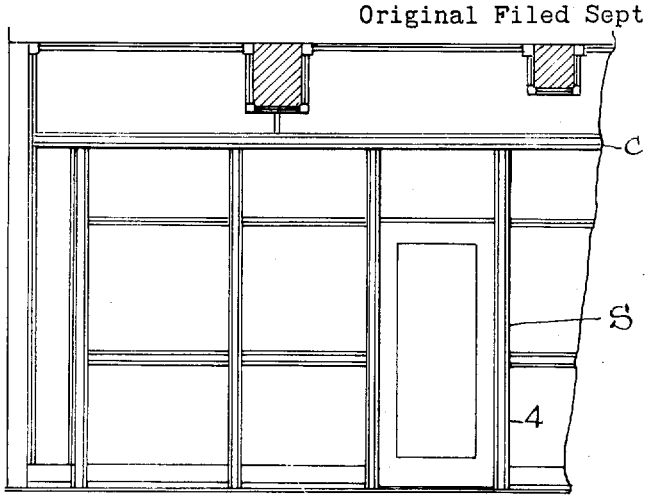
Figure 2:
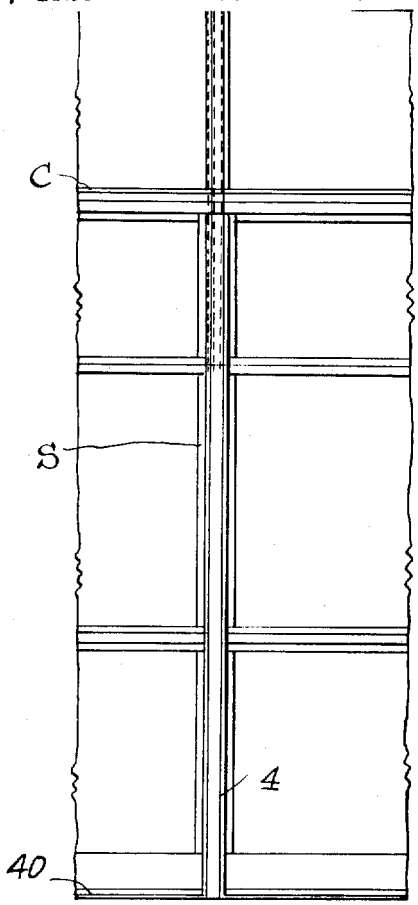
Figure 3:
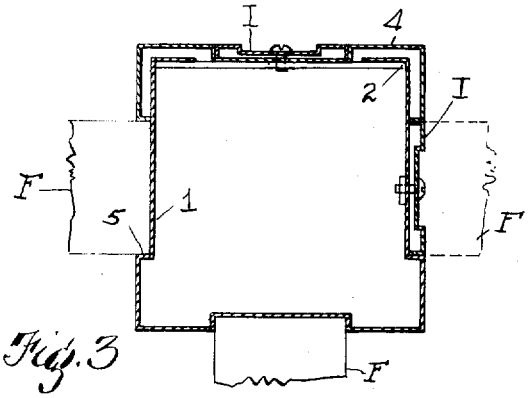
Figure 4:
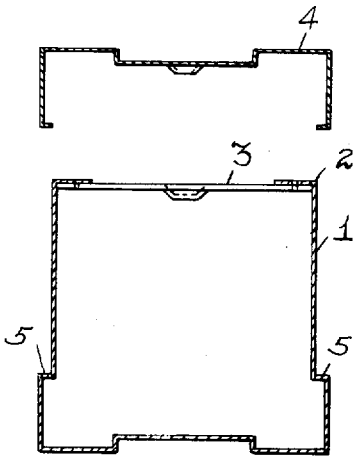
Figure 5:
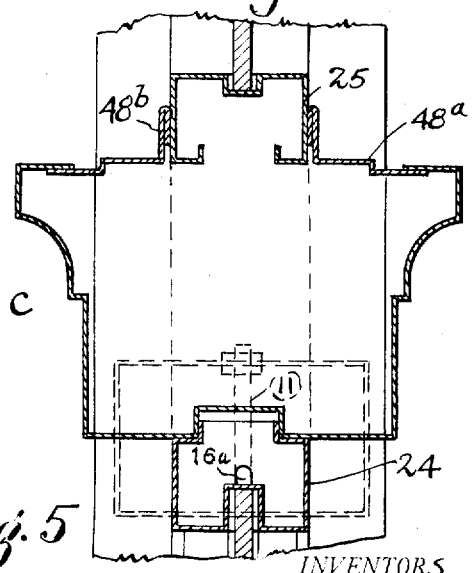
Figure 8:
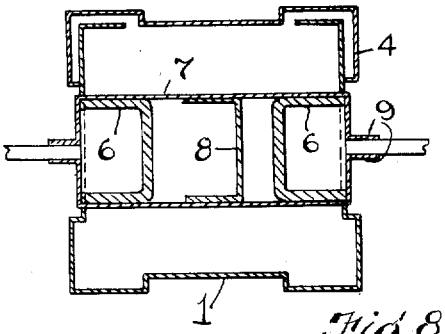
Figure 9:
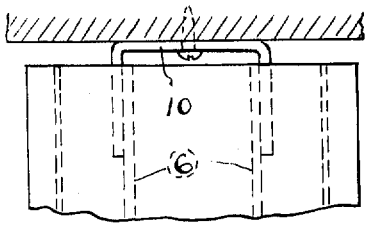
Figure 10:
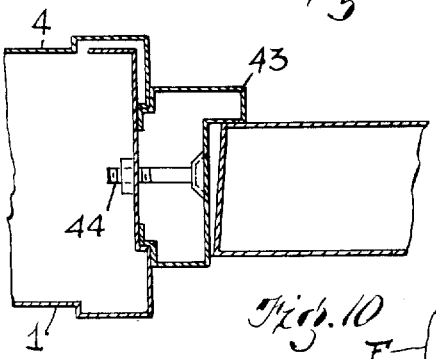
Figure 12:
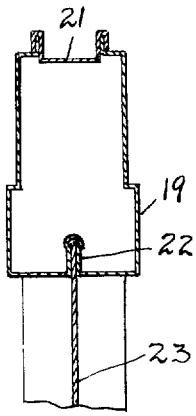
Figure 7:
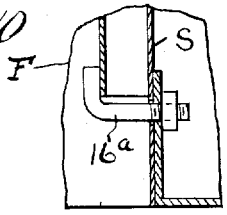
Figure 11:
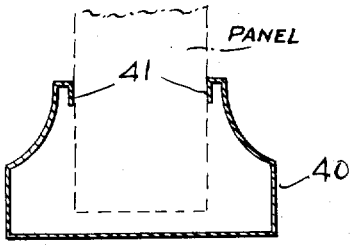

Fig. 1 is a front elevation of a partition or wall made in accordance with the present invention; Fig. 2 is a fragmentary elevation on slightly larger scale showing certain details; Fig. 3 is a transverse section of a support; Fig. 4 is a similar section of a disassembled support; Figs. 5, 6, 7 and 8 are details in section; Fig. 9 is a detail in elevation; and Figs. 10, 11 and 12, are details in section.

The support or post members S are made up in general rectangular cross section, and of longitudinal channel-form, for example a sheet metal channel piece 1 preferably having its margins 2 braced by ties 3 at spaced intervals, these being welded or riveted or the like, and a post cap or face plate 4 being arranged to engage, being secured to the support member or to the ties. A convenient mode of fastening is by screws or bolts in the face plate and ties. Shoulders or abutments 5, preferably integral, are arranged on the support member, and advantageously also on the face plate, and where symmetrically provided all around, these add to the utility and to the appearance, it being possible to assemble partition filler members F in whatever direction required, and additional ornamental inserts I may be applied where desired. These inserts may be of shallow channel strip, and suitable holding means, for instance screws or bolts may be used to secure them in place.

A cornice C will ordinarily be arranged on the supports or posts, and the latter may terminate at the cornice or there may be splices or extensions thereabove, the latter arrangement being advisable at least at intervals in rather long stretches of partition. Instead of carrying the support up in full size in all such instances, we prefer in some cases a telescoping extension comprising, for instance, spaced channel irons 6 (Fig. 8), and as desired, these may have more or less of a boxing 7 thereabout, with or without a central brace 8, as preferred, and lateral tongues 9 longitudinally for receiving filler members. The channel irons are anchored above to the ceiling by a bracket 10. To secure the supports or posts to the floor, a bracket 14, (Fig. 6), anchored by a lag screw or the like 15 may be arranged to engage at either side against the post, preferably internally, and through openings in the arms of the bracket and the post, clips 16 may be arranged, these in turn having slots through which wedges 17 may be set in order to tighten the assembly, or an angle bolt 16a (Fig. 7) may be used instead of the clip and wedge.

The filler or panel members may vary somewhat in detail, depending upon the particular needs at any given place, but ordinarily are interchangeable units, and in one advantageous form these will comprise channeled sheet metal members 18 and 19, (Fig. 12), the latter or upper being shallower, and to close these respectively, inset closures 20 and 21 are assembled, and secured in suitable manner, for instance by welding or brazing. In the opposing faces of the respective members 18, 19 are grooves or recesses 22 for receiving a panel stretcher member 23. This latter may be of sheet metal of suitable character and thickness or in some instances may be of fiber composition or glass or wire mesh. In order to secure the panels to the supports or posts, particularly where adjacent to a cornice, take-up securing means, such as clips 16 and wedges 17 (Fig. 6) may be used, or angle-bolts 16a (Fig. 7), the hook end of the clip or of the bolt being engaged with the frame element of the panel.

Figure 6:
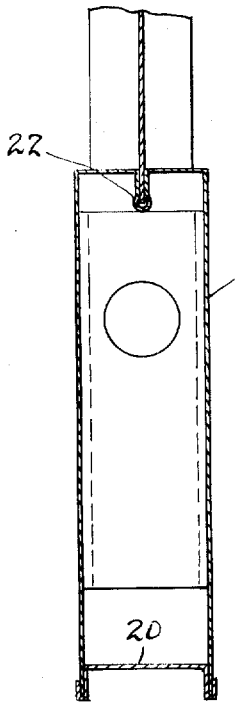
Figure 6:
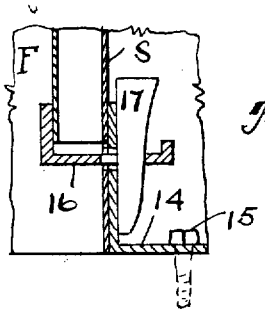

The cornice C rests upon the top of the posts, and may be secured by bolts 11 (Fig. 5) as shown more especially in our Patent No. 1,856,995, the detail being immaterial to the present application, or by brackets extending from the cornice being positioned back of and held by a wedge and clip on the order of those shown in Fig. 6.

Along the floor a mop strip 40 (Fig. 11) is preferably provided to receive the lower frame member of a panel, such mop strip being in channeled form with walls substantially normal to the base and its marginal portions extending bevelwise inwardly and terminating in compound flanges 41. The frame member of the panel and the mop strip form a telescoping joint, so that inequalities of the floor upon which the mop strip rests are provided for. At the same time the mop board has all the advantages of a one-piece construction.

By reason of the form of the abutments or shoulders where these are integrally provided on the support or post members, a stop or strike suitable for use with doors may be very readily mounted, as shown for instance in Fig. 10. The stop 43 comprising a sheet metal compound-channel member which may be secured to the post by bolts or the like 44 is thus interchangeably adaptable on a standard post, and a door can be interchangeably used in lieu of the standard sections.

As will thus be seen, the construction as a whole presents a versatility of assemblage which allows of adequately meeting the various conditions which may exist for any particular stretch of wall or partition since the supports can be provided to a standard form to be assembled in vertical or horizontal series or both, to the extent desired, and supplemented where necessary by extensions of uniform type and the panel or filler members may be of size and form required, and thinner or thicker, opaque or transparent as preferred for each particular part of the area. It will be understood also that wire mesh or grating may also be used in this relation as the panel or stretcher element of a filler portion.

Other modes of applying the principle of the invention may be employed instead of that explained, change being made as regards the features herein disclosed, provided the means stated by any of the following claims or the equivalent of such stated means be employed.

We therefore particularly point out and distinctly claim as our invention:—

1. In partition construction, the combination of an upright post member of generally rectangular channel section as a three-sided hollow sheet metal member presenting a longitudinal opening on its fourth side, and a panel-abutting face plate engageable against said post member independently of whether the panel is in position to cover such opening.

2. In partition construction, the combination of an upright post member consisting of a channel section, the web portion of said channel being one of the exposed faces of said post member, and said channel having abutments on the flange portions thereof, panel members having edge portions engaged by said abutments, and a separable channel-shaped member engageable against the face of said post independently of whether the panel is in position for retaining said panel members against said abutments.

3. In partition construction, the combination of an upright post member consisting of a channel section, the web portion of said channel being one of the exposed faces of said post member, and said channel having abutments on the flange portions thereof, panel members having edge portions engaged by said abutments, and a separable channel-shaped member lapping the post member flange portions for retaining said panel members against said abutments.

4. In partition construction, the combination of an upright post member consisting of a channel section, the web portion of said channel being one of the exposed faces of said post member, and said channel having longitudinal shoulders on the flange-portions thereof and a panel-abutting face member engaging said post member independently of whether the panel is in position and having shoulders uniform with those on the post member.

5. In partition construction, the combination of an upright post member consisting of a channel section, the web portion of said channel being one of the exposed faces of said post member, and said channel having longitudinal shoulders on the flange portions thereof, and a face member embracing marginal portions of said post member, and having panel-retaining shoulders uniform with those on the post member and being separable independently of whether a panel is in position.

6. In partition construction, the combination of a support member consisting of a channel section, the web portion of said channel being one of the exposed faces of said support member, and said channel having longitudinal shoulders on the flange portions thereof, a face member engaging said support member and having shoulders uniform with those on the support member and being separable independently of whether a panel is in position, and an insert engageable between said shoulders.

7. In partition construction, the combination of a support member consisting of a channel section, the web portion of said channel being one of the exposed faces of said support member, and said channel having a longitudinal shoulder on the flange portion thereof, a stop member engageable against said flange and shoulder, and a face member adapted to abut said stop member and being movable independently of whether said stop member is in position.

8. In partition construction, the combination of a support member consisting of a channel section, the web portion of said channel being one of the exposed faces of said support member, and said channel having a longitudinal shoulder on the flange portion thereof, a stop member engageable against said flange and shoulder, and a face member having a shoulder adapted to abut said stop member and being movable independently of whether said stop member is in position.

9. In partition construction, the combination of a support member consisting of a channel section, the web portion of said channel being one of the exposed faces of said support member, and said channel having a longitudinal shoulder on the flange portion thereof, a stop member engageable against said flange and shoulder, means for securing said stop member to said support, and a face member having a shoulder and being movable independently of whether said stop member is in position, said shoulder adapted to abut said stop member.

10. In partition construction, the combination of a sheet metal upright post member of generally channel form, the web portion of said channel being one of the exposed faces of said post member, and said channel having abutments on the flange portions thereof, a panel-abutting face member engaging the margins of the channel and being separable independently of whether a panel is in position, and means for connecting said face member and said channel member.

11. In partition construction, the combination of a sheet metal support member of generally channel form, the web portion of said channel being one of the exposed faces of said support member, and said channel having abutments on the flange portions thereof, ties bridging between the margins of the channel, a face member engaging such margins, and connecting means between said face member and said ties.

12. In partition construction, the combination of a sheet metal support member of generally channel form, the web portion of said channel being one of the exposed faces of said support member, and said channel having abutments on the flange portions thereof, spaced ties bridging between the margins of the channel, a face member embracing such margins, and screws connecting said face member to said ties.

13. In partition construction, the combination of a panel member supported with its lower edge in spaced relation to the floor, and a channel-shaped sheet metal mop strip adjustably secured to said panel member by engaging-flanges on the one embracing the other.

14. In partition construction, the combination of a panel member supported with its lower edge in spaced relation to the floor, and a channel-shaped sheet metal mop strip secured by free flanges turned bevel-wise inwardly to frictionally and adjustably embrace the panel member.

15. In partition construction, the combination of a panel member supported with its lower edge in spaced relation to the floor, and a channel-shaped sheet metal mop strip having a web engageable against the floor and having side walls substantially normal to the web and extending from thence bevel-wise inwardly and terminating in a compound flange frictionally embracing said panel member whereby said mop strip may be freely adjusted vertically of said panel member.

16. In partition construction, the combination of an upright post member comprising a sheet metal channel section, the web portion thereof constituting one of the faces of the post member and the flange portions having abutments thereon, and a separable panel-abutting face plate for closing the open side of the channel.

17. In partition construction, the combination of an upright post member comprising a sheet metal channel-section having a web and flange portions, the web portion constituting one of the faces of the post, a panel member engageable against a flange portion of said channel section, and a separable panel-abutting face-plate for closing the open side of the channel.

18. In partition construction, the combination of an upright post member comprising a sheet metal channel-section having a web and flange portions, the web portion constituting one of the faces of the post, ties extending from flange to flange, and a separable panel-abutting face-plate for closing the open side of the channel.

EARL F. HAUSERMAN.
LEROY D. MOWERY.
JOHN A. BOHNSACK.